E. B. Woodruff.
Horse Hay Fork.

No. 61697 — Patented Jan. 29, 1867.

Witnesses:
F. A. Jackson
J. A. Service

Inventor:
E. B. Woodruff
Per Munn & Co.
Attorneys

United States Patent Office.

E. B. WOODRUFF, OF MORRISTOWN, NEW JERSEY.

Letters Patent No. 61,697, dated January 29, 1867.

IMPROVEMENT IN HORSE HAY FORKS.

The Schedule referred to in these Letters Patent and making part of the same.

TO ALL WHOM IT MAY CONCERN:

Be it known that I, E. B. WOODRUFF, of Morristown, in the county of Morris, State of New Jersey, have invented a new and useful improved Horse Hay Fork; and I do hereby declare that the following is a full, clear, and exact description thereof, which will enable others skilled in the art to make and use the same, reference being had to the accompanying drawing, forming a part of this specification, in which—

Figure 1:
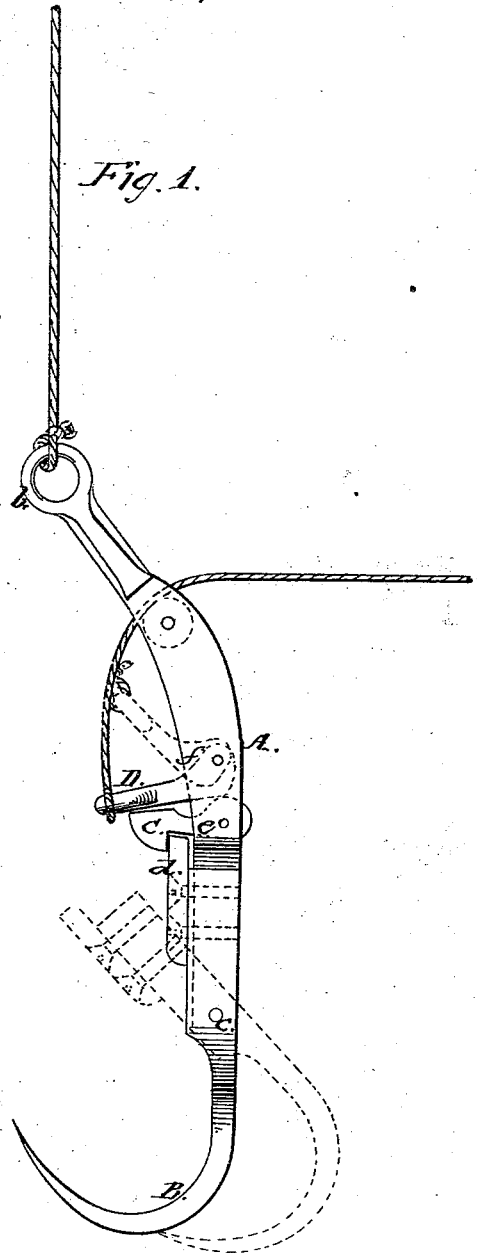
Figure 2:
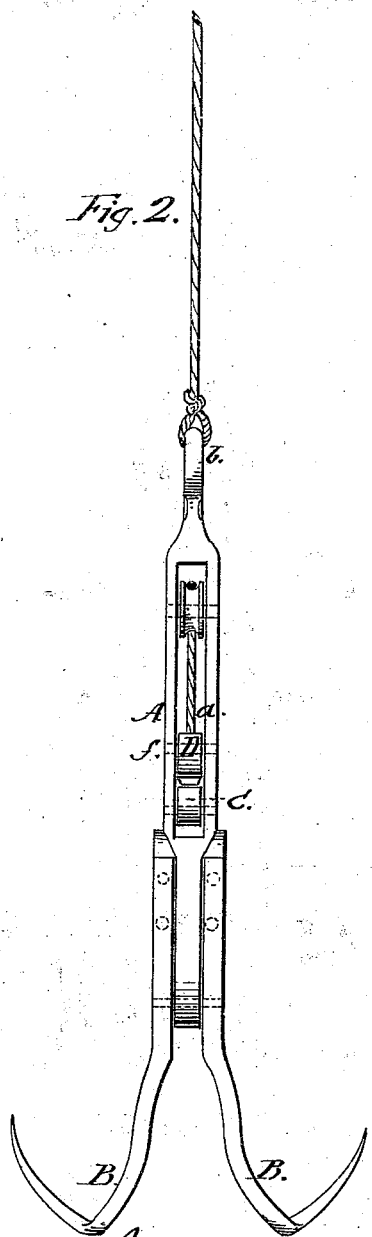

Figure 1 is a side view of my invention.
Figure 2, a rear view of the same.
Similar letters of reference indicate like parts.

This invention relates to a new and improved horse hay fork, for elevating and depositing hay in barns, and it consists in a new and improved means whereby the loaded fork is firmly secured in position, while being elevated, and rendered capable of being readily tripped so that it may discharge its load when required.

A represents the bar or shank of the fork, which is of curved form, as shown in fig. 1, and has an opening, $a$, made in it, as shown clearly in fig. 2. The upper end of the bar or shank A is provided with an eye, $b$, in which the hoisting rope is secured, and to the lower end of said bar or shank the fork is attached, the same consisting of two tines, B B, through which and the lower end of the bar or shank a pivot-bolt, $c$, passes, the tines being allowed to freely turn or work on said pivot-bolt. The tines B B are bent or curved in the usual form, and at their upper ends, above the pivot-bolt $c$, they are connected by a cross-bar, $d$. In the lower part of the opening $a$ in the bar or shank A, there is secured by a pivot, $e$, a catch or latch, C, which hooks over the upper edge of the cross-bar $d$, and in the same opening, $a$, above the catch or latch C, there is secured by a pivot, $f$, a cam-lever, D, the lower side of the pivoted end of which rests upon the upper side of the pivoted end of the catch or latch C, and keeps the latter down upon the cross-bar $d$, and causes the fork to be retained in proper position while being elevated or drawn up with its load. When the fork is elevated to the desired height, and over the spot where the load is to be discharged, the operator pulls a cord (shown in red) which is attached to the arm D, and thereby raises said arm, and the fork will tilt by its own gravity in connection with that of the load, and the latter will be discharged from the fork. The catch or latch C, it will be understood, will not hold the fork in a working position unless the arm D is bearing upon it, and hence, in order to trip the fork, all that is required is simply to raise the arm D from the catch or latch. I would remark that the usual hoisting tackle may be applied to the fork arranged in the ordinary way.

I claim as new, and desire to secure by Letters Patent—

The cam-lever D, pivoted to the bar A, in combination with the catch C and the pivoted forks B, provided with the cross-bar $d$, constructed and operating substantially as described, for the purpose specified.

The above specification of my invention signed by me this 3d day of August, 1866.

E. B. WOODRUFF.

Witnesses:
WM. F. MCNAMARA,
ALEX. F. ROBERTS.